(12) United States Patent
Audet

(10) Patent No.: US 8,007,558 B2
(45) Date of Patent: Aug. 30, 2011

(54) ORGANO-MINERAL SOIL AMENDMENT

(75) Inventor: Jacques Audet, Bromont (CA)

(73) Assignee: Maxeco Organo-Mineral (Canada) Inc., St-Hyacinthe (CA)

( * ) Notice: Subject to any disclaimer, the term of this patent is extended or adjusted under 35 U.S.C. 154(b) by 325 days.

(21) Appl. No.: 12/303,015

(22) PCT Filed: Jun. 11, 2007

(86) PCT No.: PCT/CA2007/001029
§ 371 (c)(1),
(2), (4) Date: Dec. 1, 2008

(87) PCT Pub. No.: WO2007/143826
PCT Pub. Date: Dec. 21, 2007

(65) Prior Publication Data
US 2009/0241624 A1    Oct. 1, 2009

Related U.S. Application Data

(60) Provisional application No. 60/804,600, filed on Jun. 13, 2006.

(51) Int. Cl.
*C05F 11/08* (2006.01)

(52) U.S. Cl. .......... 71/6; 71/7; 71/8; 71/9; 71/10

(58) Field of Classification Search ........ 71/6–10
See application file for complete search history.

(56) References Cited

U.S. PATENT DOCUMENTS

| | | | | |
|---|---|---|---|---|
| 2,820,703 A * | 1/1958 | Dresser et al. | ...... | 71/9 |
| 3,761,237 A * | 9/1973 | Jeffreys | ...... | 71/9 |
| 4,952,230 A * | 8/1990 | Norlund | ...... | 71/9 |
| 5,106,405 A * | 4/1992 | Goto | ...... | 71/7 |
| 5,186,731 A * | 2/1993 | Parker | ...... | 71/5 |
| 5,354,349 A * | 10/1994 | Inoue | ...... | 71/9 |
| 5,401,291 A * | 3/1995 | Inoue | ...... | 71/9 |
| 5,417,861 A * | 5/1995 | Burnham | ...... | 210/609 |
| 5,441,877 A * | 8/1995 | Chiaffredo et al. | ...... | 435/176 |
| 5,443,612 A * | 8/1995 | Havens | ...... | 71/5 |
| 5,466,273 A | 11/1995 | Connell | | |
| 5,597,399 A * | 1/1997 | Basu et al. | ...... | 71/9 |
| 5,741,346 A | 4/1998 | Glover | | |
| 5,755,858 A * | 5/1998 | Barnett | ...... | 71/9 |
| 6,254,654 B1 * | 7/2001 | Van Barneveld | ...... | 71/8 |
| 6,461,399 B1 | 10/2002 | Connell | | |
| 6,582,637 B1 | 6/2003 | Phinney | | |
| 6,645,267 B1 * | 11/2003 | Dinel | ...... | 71/11 |
| 6,793,704 B2 | 9/2004 | You | | |
| 6,846,343 B2 | 1/2005 | Sower | | |
| 7,019,036 B2 * | 3/2006 | Hiromoto | ...... | 514/775 |
| 7,160,714 B2 * | 1/2007 | Matano | ...... | 435/262 |
| 7,497,890 B2 * | 3/2009 | Sahl | ...... | 71/14 |
| 2004/0123637 A1 * | 7/2004 | Rostrom | ...... | 71/8 |
| 2006/0032281 A1 * | 2/2006 | Meyer | ...... | 71/6 |

FOREIGN PATENT DOCUMENTS

| | | |
|---|---|---|
| EP | 0444392 A2 | 9/1991 |
| EP | 0444392 B1 | 2/1993 |
| EP | 0597417 A1 | 5/1994 |
| JP | 09132488 A2 | 5/1997 |
| JP | 2000239083 A2 | 9/2000 |
| JP | 20044107618 A2 | 4/2004 |
| WO | WO 01/13706 A1 | 3/2001 |
| WO | WO 2005/102965 A1 | 11/2005 |
| WO | WO 2005/117581 A1 | 12/2005 |

OTHER PUBLICATIONS

International Search Report published on Sep. 20, 2007.

* cited by examiner

*Primary Examiner* — Wayne Langel

(74) *Attorney, Agent, or Firm* — Goudreau Gage Dubuc; Isabelle Pelletier

(57) ABSTRACT

A soil amendment comprising compost and between about 5% and about 30% by weight of an agricultural liming material, wherein at least about 50% of said liming material has an average particle size of about 65 microns or less is described. Methods for using and manufacturing this soil amendment are also described.

28 Claims, No Drawings

ORGANO-MINERAL SOIL AMENDMENT

CROSS REFERENCE TO RELATED APPLICATIONS

This application is a National Entry Application of PCT application no. PCT/CA2007/001029 filed on Jun. 11, 2007 and published in English under PCT Article 21(2), which itself claims priority on U.S. provisional application Ser. No. 60/804,600, filed on Jun. 13, 2006. All documents above are incorporated herein in their entirety by reference.

FIELD OF THE INVENTION

The present invention relates to organo-mineral soil amendments. More specifically, the present invention is concerned with a soil amendment comprising compost and an agricultural liming material.

BACKGROUND OF THE INVENTION

Because of intensive agriculture, the soils are always in need of soil amendments to modify their chemical, physical and/or biochemical properties and to feed the cultivated plants. Indeed, every season, plants draw from the soil the nutrients they need to grow. Soil amendments are therefore needed to put back into the soil the nutrients that the next crop will require and optimize the soil's physical, chemical and biochemical characteristics.

Soil amendments, also called soil conditioners, are materials added to soil to improve plant growth and health. Generally speaking, a soil amendment is any material added to a soil to improve its physical, biochemical or chemical properties. The type of amendment added depends on the current soil composition, climate and the type of plant. Some soils lack nutrients necessary for proper plant growth and others hold too much or too little water. An amendment or a combination of amendments corrects the soil's deficiencies. The goal is to provide a better environment for roots.

For example, lime is used to make a soil less acidic. Fertilizers, such as peat, manure, anaerobic digestate or compost, add depleted plant nutrients. Materials such as clay, vermiculite, hydrogel and shredded bark will make soil hold more water. Gypsum releases nutrients and improves soil structure. Other soil characteristics that can be modified by an amendment include water retention, permeability, water infiltration, drainage, aeration and structure.

There are two broad categories of soil amendments: organic and inorganic. Organic amendments come from something that is or was alive. Inorganic amendments, on the other hand, are either mined or man-made. Organic amendments include sphagnum peat, wood chips, grass clippings, straw, compost, manure, biosolids, sawdust and wood ash. Traditionally, manure has been used in agriculture as a soil amendment. Compost however is much less used for this purpose because of transport and handling difficulties and costs among others. Inorganic amendments include vermiculite, perlite, tire chunks, pea gravel and sand.

Organic amendments increase soil organic matter content and offer many benefits. Organic matter improves soil aeration, water infiltration, and both water- and nutrient-holding capacity. Many organic amendments contain plant nutrients and act as organic fertilizers. Organic matter also is an important energy source for bacteria, fungi and earthworms that live in the soil.

Some organo-mineral fertilizers, i.e. fertilizers comprising both an organic and an inorganic component, have been described. For example, JP 09132488 describes molded cattle faeces compost, with sawdust, quicklime, and water-absorptive clay mineral prepared by pressure extrusion. PCT application WO 01/13706 describes a pelleted fertilizer comprising specially treated compost and a chemical fertilizer. European patent application 0 597 417 describes a pelleted or granular fertilizer comprising compost and a mineral or organic fertilizer. JP 2000239083 describes a coated fertilizer comprising compost and quicklime. Also, a tribomechanical method for activating the mineral components, and optionally the organic component, in an organo-mineral fertilizer or soil amendment has been described (EP 0 444 392). Fertilizers comprising raw manure have also been described (U.S. Pat. No. 5,741,346). Also, U.S. Pat. No. 6,582,637 presents a compost granulation method.

There is a continuing need for new soil amendments. These amendments may have any of a number of desirable characteristics depending on the type of soil and cultivated plant.

The present description refers to a number of documents, the content of which is herein incorporated by reference in their entirety.

SUMMARY OF THE INVENTION

In accordance with the present invention, there is provided an organo-mineral soil amendment.

This invention relates to a soil amendment comprising compost and between about 5% and about 30% by weight of an agricultural liming material, wherein at least about 50% by weight of the liming material has an average particle size of about 65 microns or less.

As used herein, a "soil amendment" means a material that is added to the soil for the purpose of improving its physical, chemical and/or biological characteristics and/or providing one or more nutrients to cultivated plants; "amending a soil" means adding a suitable material to a soil in order to improve its physical, chemical and/or biological characteristics and/or provide it with one or more nutrients. Examples of characteristics that may be influenced by soil amendments such as that of the present invention or that of the prior art are: tilth, porosity, aeration, aggregation, texture, moisture-holding capacity, infiltration rates, drainage, nutrients, organic content, ion exchange capacity, microbial viability, the living activities capability of the different microorganism present in the soils, and the nature and density of these microorganism.

As used herein, "compost" refers to an organic material comprising decomposed or partially decomposed remnants of organic materials resulting from the break down of these materials by bacteria, fungi, and other organisms, i.e. from the composting process.

The compost used for the present invention may have a carbon to nitrogen (C/N) ratio between about 1 and about 13. Any other C/N ratio may also be used. More specifically, the C/N ratio may be 13. A C/N ratio of 13 indicates that there is no more decomposition or digestion going on and that the compost reaction is stabilized and most ready to give all its nutrients to the environment, e.g. the root of plants or soil microorganisms.

The method by which the compost used in the present invention is prepared and the starting materials used to prepare it, do not have any significant impact on the present invention. The compost may be prepared by any methods known in the art. For example, it may be prepared "naturally" in free air, in an aerobic reactor, in an anaerobic reactor or any combination of these methods. The starting materials used for preparing the compost may be any material known by those of skill in the art to be compostable (digestible). Namely, any material that is putrescible may be used as a starting material. Also any digestible or partly digested organic materials can be used to prepare the compost used in the present invention. For example, manure of different animals, such as cows, pigs, horses, hens and others, may be used as a starting material. Also, any organic sludge (municipal, slaughterhouse, etc.), wood residues, industrial organic residues, crops residues, etc. may be used.

The inventor found that the use of compost rather than undigested organic materials, such as raw manure, improves the performances of the soil amendment. Without being bound by theory, it is believed that undigested organic materials must first be digested (by soil bacteria) in order to make their nutrients available to the plants, which takes times and necessitates using more undigested organic materials to obtain the same effect as with compost.

As used herein "agricultural liming material" means any liming material commonly used in agriculture, horticulture and similar fields, with the exception of quicklime (which is also called burnt lime, caustic lime, CaO and calcium oxide) and slaked lime (which is also called hydrated lime, $Ca(OH)_2$ and calcium hydroxide), which should be avoided because of their burning effect.

The inventor found that the combination of between about 5% and about 30% by weight of such an agricultural liming material, wherein at least about 50% by weight of the liming material has an average particle size of about 65 microns or less, with compost improves the performances of the soil amendment. The inventor observed that use of a coarser liming material did not yield results that were as good as a fine liming material (one with at least about 50% by weight of the liming material having an average particle size of about 65 microns or less).

In fact, the inventor observed that a combination of compost with a fine liming material exhibited very beneficial effects on the growth and health of plants, that are not present when compost or an ordinary agricultural liming material are used alone or in combination.

Accordingly, the agricultural liming material used in the present invention may be, without being limited, calcic lime (which is also called $CaCO_3$, calcium carbonate, calcite, calcic limestone and crushed or ground limestone), dolomitic lime (which is also called $CaCO_3+MgCO_3$, calcium-magnesium carbonate, dolomite, dolomitic limestone and crushed or ground magnesium carbonate-rich limestone), foundry residues, cement manufacturing residues, such as Tubrex™, and mixtures thereof.

More specifically, the liming material may advantageously be calcic lime or dolomitic lime with a high degree of purity. For example, such lime may comprise less than 10%, 5%, 2% or 1% by weight of impurities.

Therefore, in specific embodiments, the liming material may be selected from the group comprising of calcic lime, dolomitic lime, foundry residues, cement manufacturing residues and a mixture thereof. More specifically, the liming material may be calcic lime, dolomitic lime or a mixture thereof. Also, the calcic lime or dolomitic lime may comprise less than about 10% by weight of impurities.

In specific embodiments, the soil amendment may comprise between about 10% by weight and about 20% by weight of the liming material. More specifically, the soil amendment may comprise about 15% by weight of the liming material.

In specific embodiments, at least about 60%, 70%, 80%, 90%, 95%, 99% or 100% by weight of the liming material has an average particle size of about 65 microns (which corresponds to 250 mesh) or less.

In other specific embodiments, 80%, 90%, 95% or 100% by weight of the liming material may have an average particle size of about 45 microns or less (mesh size 325).

In other specific embodiments, at least about 80%, 90%, 95% or 100% by weight of the liming material has an average particle size between about 38 microns (mesh size 400) and about 65 microns (mesh size 250), and in more specific embodiments at least about 75%, 85% or 95% by weight or more of the liming material has an average particle size of about 45 microns or less.

In particular embodiments of the invention, more than about 97%, 98%, 99% or 100% by weight of the liming material has an average diameter about 65 microns or less, between about 72% and about 78% by weight of the liming material has an average diameter of about 45 microns or less, and between about 12% and about 18% by weight of the liming material has an average diameter of about 38 microns or less.

The liming material may be ground to the desired size using any grinding methods known to the person of skill in the art. Non limiting examples of such methods are a ball mill, a hammer atomizer with dust collector, a dust collector of ordinary primary and secondary jaw crusher, etc. No tribomechanical activation is applied. In a specific embodiment of the present invention, the liming material may advantageously be ground using a method which minimizes the heating of the material. An example of such a method is the hammer atomizer, which generates inter-shocking of the mineral particles among themselves.

The soil amendment may be in the form of blended powders of compost and agricultural liming material. The soil amendment may also be in the form of granules manufactured without using excessive heat or pressure. In specific embodiments, the granules may comprise a suitable binding agent.

The present invention also relates to a method of manufacturing the above-described soil amendment. More specifically, the present invention relates to a method of manufacturing a soil amendment comprising forming a blend comprising compost and between about 5% and about 30% by weight of an agricultural liming material, wherein at least 50% by weight of the liming material has an average particle size of about 65 microns or less. This produces the soil amendment in the form of blended powders of compost and agricultural liming material.

The method may further comprise the step of granulating the blend without using excessive heat or pressure, thereby producing granules. More specifically, the soil amendment of the present invention may be granules formed by granulation methods that do not involve excessive pressurizing or heating of the granules or starting blend. The temperature would optimally be not more than 5 or 10° C. above normal composting temperature (the temperature naturally generated inside a pile of starting material that is being composted and which is somewhere around 70° C. depending on compost itself and other factors). The pressure would optimally be not much higher than that caused by the mixing of the blend or that caused by the piling of the fresh wet starting material used to fabricate the compost. Any granulation method responding to these criteria may be used. Non limiting examples of such method include pan granulation, Eirich granulation and rotating disc granulation.

More specifically, pan granulation or Eirich granulation can be used. In the Eirich method, a rotating drum equipped with a blade rotating in the direction contrary to that of the drum is used to effect the granulation. Other granulation techniques known in the art and that do not include excessive pressure or heat, such as rotating disc granulation of all of the components mixed together, may also be used.

Granulation by extrusion, molding or using a hot-air drum, which are most commonly used in the soil amendment industry, are optimally avoided as they generally involve too much heating and/or pressure. The inventor found that the granulation of the soil amendment using methods that do not involve excessive pressurizing or heating of the granules or starting blend unexpectedly result in better performances of the soil amendment. Without being bound by theory, it is believed that excessive heat or pressure somewhat degrades the compost in the soil amendment and therefore decreases the performances of the soil amendment. Consequently, the granulation technique should not involve excessive pressure or heat so as to preserve the integrity of the mineralized organic matter (compost). It is also believed that the less compact soil amendment produced by avoiding pressurizing of the starting material makes the nutrients therein more readily available to the plants. Also, the inventor observed that the dominant microorganism population present in soil amendment produced using process involving heat and pressure (such as extrusion) are different from that of a soil amendment produced using a granulation process not involving excessive pressure or heat. The microorganisms observed when excessive heat and pressure are used are also different than that observed in healthy and fertile soils. The inventor further observed that crops to which soil amendments produced using granulation method involving excessive heat and pressure react the same way as when raw manure is added. That is a slowdown of the growth of the plant was observed for many months in all the crops tested.

Following granulation, it may be desirable to dry the granules. Such drying may be effected by any method known to the person of skill in the art that do not involve excessive pressure or temperature as described above. For example, drying by sub-fluidization may be used.

To facilitate granulation, a suitable binding agent may be used. The method may further comprise adding a suitable binding agent to the blend prior to granulating the blend.

Any binding agent known to the person of skill in the art to be suitable for use in soil amendments may be used. More specifically, any non-toxic water soluble binding agent known in the arts of agriculture, fertilizers, alimentation, and/or mining may be used. More specifically, calcium or sodium lignosulphonate compounds, such as Lignosol™ may be used. Also, honey, molasses or any binder solution compatible with ecologic uses with high solubility in water may be used.

More specifically, in specific embodiments, the binding agent may be calcium lignosulphonate, sodium lignosulphonate, lignosol, honey or molasses. In specific embodiments, the binding agent may be lignosol. In more specific embodiments, ARBO S01 or ARBO C01 (lignosol) diluted in clean water with a ratio of 1:4 in a 12% by weight water dilution can be used.

The granules may be of any size that is suitable for their use as a soil amendment. More specifically, 100% or more than about 85%, 90% or 95% by weight of the granules may have an average diameter between about 0.5 and about 10 mm, between about 0.5 and about 1.5 mm, between about 1.5 and about 6.5 mm or between about 6.5 and about 10 mm.

More specifically, in specific embodiments, more than 95% by weight of the granules may have an average diameter between about 0.5 mm and about 10 mm. More than 95% by weight of the granules may have an average diameter between about 0.5 mm and about 1.5. More than 95% by weight of the granules may have an average diameter between about 1.5 mm and about 6.5 mm. More than 95% by weight of the granules may have an average diameter between about 6.5 mm and about 10 mm.

The soil amendment of the present invention may be used for amending a soil, simply by adding the soil amendment of the invention to the soil. Therefore, the present invention also relates to a method of amending a soil comprising adding the soil amendment of the invention to the soil.

The soil amendment may be added to the soil before, during or after seeding. The soil amendment can be added to the soil using seeding equipments, spreaders, or any other type of equipment able to handle granulated amendments and/or fertilizers commonly known in the art.

The amended soil may be used for growing any type of plants. More particularly, the soil may be used for agriculture, horticulture, silviculture, arboriculture, aquiculture (aquaponic, hydroponics, etc.), fruit and vegetable cultures, gardening or for growing interior plants or potted plants.

In specific embodiments, a chemical fertilizer, a mineral fertilizer, another soil amendment or a mixture thereof may be added to the soil before, after or while the soil amendment is being added to the soil. In more specific embodiments, the chemical fertilizer, mineral fertilizer, other soil amendment or mixture thereof is mixed with the soil amendment prior to the soil amendment being added to the soil.

Other objects, advantages and features of the present invention will become more apparent upon reading of the following non-restrictive description of specific embodiments thereof, given by way of example only.

DESCRIPTION OF SPECIFIC EMBODIMENT

The present invention is illustrated in further details by the following non-limiting examples.

Example 1

A soil amendment of the invention was manufactured. The liming material used was dolomitic lime. The lime was grinded using a hammer atomizer until it could pass through a 250 mesh screen.

A blend comprising 83.5% of compost, 15% of dolomitic lime and 1.5% Lignosol (Arbo C01) 1:4 in $H_2O$ was formed (all % by weight). This blend was granulated using the Eirich method and then dried.

Example 2

The performances of Example 1 were compared to that of different amount of a nitrate fertilizer (32-0-0). These tests were carried out at Saint-Bruno de Montarville and Saint-Hyacinthe, province of Québec, Canada, in 2006.

The soil amendment of Example 1 (Ex. 1) and nitrate fertilizer were applied to corn sprouts and the yield of the different lots was measured at harvest. The results obtained are presented in the tables below.

From the data present in these tables, it has been calculated that, very interestingly, adding about 100 kg/ha of the soil amendment of the invention gives about the same yields as 50 kg/ha of N (32-0-0) fertilizer. This means that the soil amendment of the invention can be added to a given amount of fertilizer to add to its effect or can be used to replace part of this fertilizer. This is particularly interesting because the soil amendment of the invention is generally cheaper than the N (32-0-0) fertilizer, which could mean significant savings for the users.

TABLE 1

Yields obtained at St-Bruno de Montarville for the soil amendment of Example 1 (Ex. 1) and the nitrate fertilizer [N (32-0-0)]

| Amendment used (amount used) | Quatity (kg/ha) | Yield (kg/ha) |
|---|---|---|
| N (32-0-0) | 0 | 9238 c |
| N (32-0-0) | 40 | 9474 c |
| N (32-0-0) | 80 | 9438 c |
| N (32-0-0) | 120 | 12909 a |
| N (32-0-0) | 160 | 13014 a |
| N (32-0-0) | 200 | 12958 a |
| N (32-0-0) | 240 | 12934 a |
| Ex. 1 | 100 | 9810 bc |
| Ex. 1 | 200 | 11088 b |
| Ex. 1 | 300 | 9421 c |
| Ex. 1 | 400 | 10641 bc |
| Ex. 1 (dried in air) | 100 | 10700 bc |

In this table, each yield value followed by the same letter that another yield value is not significantly different from this other value. Ex. 1 means the soil amendment of Example 1 dried in a fluidized bed. Ex. 1 (dried in air) means the soil amendment of Example 1 dried in air.

TABLE 2

Yields obtained at St-Hyacinthe for the soil amendment of Example 1 (Ex. 1) and the nitrate fertilizer [N (32-0-0)]

| Amendment used (amount used) | Quatity (kg/ha) | Yield (kg/ha) |
|---|---|---|
| N (32-0-0) | 0 | 9615 e |
| N (32-0-0) | 40 | 12062 cd |
| N (32-0-0) | 80 | 11858 cd |
| N (32-0-0) | 120 | 13124 ab |
| N (32-0-0) | 160 | 13206 ab |
| N (32-0-0) | 200 | 13651 a |
| N (32-0-0) | 240 | 12681 bc |
| Ex. 1 | 100 | 11458 d |
| Ex. 1 | 200 | 11730 d |
| Ex. 1 | 300 | 11869 cd |
| Ex. 1 | 400 | 11659 d |
| Ex. 1 (dried in air) | 100 | 11527 d |

In this table, each yield value followed by the same letter that another yield value is not significantly different from this other value. Ex. 1 means the soil amendment of Example 1 dried in a fluidized bed. Ex. 1 (dried in air) means the soil amendment of Example 1 dried in normal surrounding air.

Example 3

The performances of the soil amendment of Example 1 used in conjunction with regular fertilizers were compared with that of different amounts of regular fertilizers used alone or accompanied by granules of different composition. More specifically, 5 different granule compositions, including that of Example 1, were tested:
  Granule A: 50% compost and 50% by weight dolomitic lime having an average diameter of 65 microns or less;
  Granule B: only compost;
  Granule C: only dolomitic lime having an average diameter of 65 microns or less; or
  Granule D: granules of Example 1: 83.5% by weight compost, 15% dolomitic lime having an average diameter of 65 microns or less; and
  Granule E: 20% manure, 75% compost, 5% by weight dolomitic lime having an average diameter of 65 microns or less.

These tests were performed on a variety of cultures such as corn, Iceberg lettuce, grass, okras, hot peppers and potted plants. Granule D gave better results than the other granules tested. Also, better results—or much better results (depending on the conditions of use)—were observed when the soil amendment of the invention was used in conjunction with regular fertilizers than when the same dosage of regular fertilizer was used alone. In general, yields were about 10% to about 15% higher (by weight of produce) when the soil amendment of the invention was used. It was observed that the soil amendment of the invention allowed using less regular fertilizers while obtaining the same good results in the fields.

Significantly, granule E (containing undigested manure) caused retardation in plant growth and a decrease of the yields. It was also observed that granule D gave better results than the use of manure alone.

More details on some of these tests are provided below, wherein the granules are as indicated above.

2004, Ste-Madeleine, Québec, Canada:
  Corn was fertilized at seeding using either:
    250 lbs/ac of granules A and 500 lbs/ac of 11-19-17 fertilizer;
    250 lbs/ac of granules B and 500 lbs/ac of 11-19-17 fertilizer;
    250 lbs/ac of granules D and 500 lbs/ac of 11-19-17 fertilizer; or
    500 lbs/ac of 11-19-17 fertilizer (Control).
  0.4% Mg, 0.8% Zn, 0.1% B, 3% S, and 0.04% Fe were added to the 11-19-17 fertilizer. All of the plots also received 275 lbs/ac of 27-0-0 fertilizer after sprouting.

The plants were first evaluated during growth. The best results were obtained for granule D which gave plants that were fuller and had a better general appearance than those of the control plot. Noteworthyly, at the time of this observation, the plants of the control plots had already received the 27-0-0 fertilizer (after sprouting) while the plots with granule D had not. This further emphasizes the beneficial impact of granule D on the growth of the plants.

In general, the plots treated with granule A did not gave results as good as the control plots, while the plots treated with granule B gave results that were equivalent to those of the control plots.

The same observations were made at harvest.

2004, St-Marcel, Québec, Canada:
  Grass was fertilized at seeding using a conventional fertilizer and either granule D; granule B; granule C, compost, pig manure; or nothing (Control plot).

The plots treated with granule C did not show any differences with the control plots. The plots treated with either manure or compost were greener that the control plots. Granules B and D resulted in grass that was less sparse. It was observed that the denser plots were those that received the larger dosage of granules.

2004, Ste-Clothide, Québec, Canada:
  Iceberg lettuce was fertilized at seeding using 2 metric tons per 4 acres of either:
    a mixture of 193 kg of granule D, 254 kg of granule A, 396 kg of 6-15-30 fertilizer, 4.5 kg of copper and 18.5 kg of manganese; or
    a mixture of 396 kg of 6-15-30 fertilizer, 4.5 kg of copper and 18.5 kg of manganese (Control).

The plots treated with the first mixture gave better results than the control plots. The lettuce in the plots treated with the granules was bigger, greener, and firmer.

2004, Les Cèdres, Québec, Canada:
  Okras were fertilized multiple times during the growing season using either:
    granules D and a conventional fertilizer (1:1 ratio);
    granules D and a conventional fertilizer (2:1 ratio); or
    the conventional fertilizer only (Control).

The plots treated with granules D gave a yield approximately 25% higher than the yield of the control plots.

The same test was performed with hot peppers. It was observed that the hot pepper plants treated with granule D were bigger and fuller than those of the control plot. The best results were obtained for a dose of 20 liters of granules D per 8 hot pepper plants.

2004, Interior Plants, Potted Plants and Plants in Planters:

The tested plants were parsley, chive, mint, thyme, rose tree (miniature), Osterpernum, Star of Bethlehem, New Guinea Impatiens, Streptocarpus, Cacti (8 species), Aralia (2 species), Anthurium, Spathyphillum, fir tree, cedar and rose tree (regular).

A 1-inch blanket of a blend of granules D and E was deposited on the soil of the plants. All the plants reacted very favorably. It was noted that more water was necessary the first 2 or 3 times the plants were watered.

Example 4

The granulated soil amendment of the invention was manufactured as described in Example 1. A soil amendment having the same composition but granulated by extrusion, i.e. a process that does involves excessive heat and pressure, was also tested. This amendment was dried in normal surrounding air.

Both soil amendments were tested in corn fields together with chemical fertilizers and compared with plots where chemical fertilizers alone were used. More specifically, all plots were first fertilized before seeding using 130 kg N/ha. Then, during seeding, different plots received either the chemical fertilizer alone ($40N+35\,P_2O_5+20\,K_2O$) or both the chemical fertilizer and either soil amendment.

Again, the soil amendment of Example 1 gave a yield significantly higher than that of the control plots fertilized using only the chemical fertilizer. In contrast, the soil amendment granulated by extrusion gave a yield significantly lower than that of the control plots.

Although the present invention has been described hereinabove by way of specific embodiments thereof, it can be modified, without departing from the spirit and nature of the subject invention as defined in the appended claims.

What is claimed is:

1. A soil amendment comprising compost and between about 5% and about 30% by weight of an agricultural liming material, wherein at least about 50% of said liming material has an average particle size of about 65 microns or less, and wherein said soil amendment is in the form of granules manufactured without using excessive heat or excessive pressure.

2. The soil amendment of claim 1 wherein at least about 90% by weight of said liming material has an average particle size of about 45 microns or less.

3. The soil amendment of claim 1 wherein said liming material is calcic lime, dolomitic lime, foundry residues, cement manufacturing residues or a mixture thereof.

4. The soil amendment of claim 1 wherein said liming material is calcic lime, dolomitic lime or a mixture thereof.

5. The soil amendment of claim 4 wherein said calcic lime or dolomitic lime comprises less than about 10% by weight of impurities.

6. The soil amendment of claim 1 comprising between about 10% and about 20% by weight of said liming material.

7. The soil amendment of claim 1 wherein said granules are manufactured without using mechanical pressure and at a temperature not higher than about 70° C.

8. The soil amendment of claim 1 wherein said granules are manufactured by pan granulation, by rotating disk granulation, or by Eirich granulation.

9. The soil amendment of claim 8 wherein said granules are manufactured by Eirich granulation.

10. The soil amendment of claim 1 wherein said granules comprise a suitable binding agent.

11. The soil amendment of claim 10 wherein said binding agent is calcium lignosulphonate, sodium lignosulphonate, lignosol, honey or molasses.

12. The soil amendment of claim 1 wherein more than 95% by weight of said granules have an average diameter between about 0.5 mm and about 10 mm.

13. The soil amendment of claim 1 wherein said compost has a carbon to nitrogen ratio about 13.

14. A method of amending a soil comprising adding the soil amendment of claim 1 to said soil.

15. The method of claim 14 wherein the soil amendment is added to the soil prior to, during or after seeding.

16. The method of claim 14 wherein a chemical fertilizer, a mineral fertilizer, another soil amendment or a mixture thereof is added to the soil before, after or while said soil amendment is being added to said soil.

17. A method of manufacturing a soil amendment, the method comprising:

forming a blend comprising compost and between about 5% and about 30% by weight of an agricultural liming material, wherein at least 50% by weight of said liming material has an average particle size of about 65 microns or less, and granulating said blend without using excessive heat or excessive pressure, thereby producing granules.

18. The method of claim 17 wherein at least about 90% by weight of said liming material has an average particle size of about 45 microns or less.

19. The method of claim 17 wherein said liming material is calcic lime, dolomitic lime, foundry residues, cement manufacturing residues or a mixture thereof.

20. The method of claim 19 wherein said liming material is calcic lime, dolomitic lime or a mixture thereof.

21. The method of claim 20 wherein said calcic lime or dolomitic lime comprises less than about 10% by weight of impurities.

22. The method of claim 17 wherein said blend comprises between about 10% and about 20% by weight of said liming material.

23. The method of claim 17 wherein said granules are manufactured without using mechanical pressure and at a temperature not higher than about 70° C.

24. The method of claim 17 wherein said blend is granulated by pan granulation, by Eirich granulation, or by rotating disk granulation.

25. The method of claim 24 wherein said blend is granulated by Eirich granulation.

26. The method of claim 17 wherein said method further comprises adding a suitable binding agent to said blend prior to granulating the blend.

27. The method of claim 26 wherein said binding agent is calcium lignosulphonate, sodium lignosulphonate, lignosol, honey or molasses.

28. The method of claim 17 wherein more than 95% by weight of said granules have an average diameter between about 0.5 mm and about 10 mm.

* * * * *